United States Patent
Wang et al.

(10) Patent No.: US 10,880,785 B2
(45) Date of Patent: Dec. 29, 2020

(54) RESOURCE OBTAINING METHOD AND RELATED DEVICE

(71) Applicant: HUAWEI TECHNOLOGIES CO., LTD., Guangdong (CN)

(72) Inventors: Sichen Wang, Shenzhen (CN); Jiaxin Yin, Nanjing (CN); Yongjing Zhang, Nanjing (CN); Mitch Tseng, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 16/051,988

(22) Filed: Aug. 1, 2018

(65) Prior Publication Data
US 2018/0343590 A1 Nov. 29, 2018

Related U.S. Application Data

(63) Continuation of application No. PCT/CN2017/071939, filed on Jan. 20, 2017.

(30) Foreign Application Priority Data

Feb. 2, 2016 (CN) .......................... 2016 1 0072844

(51) Int. Cl.
*H04W 4/70* (2018.01)
*H04W 28/26* (2009.01)
(Continued)

(52) U.S. Cl.
CPC ........ *H04W 28/26* (2013.01); *G06F 16/9574* (2019.01); *H04L 29/08* (2013.01);
(Continued)

(58) Field of Classification Search
None
See application file for complete search history.

(56) References Cited

U.S. PATENT DOCUMENTS

2004/0068579 A1* 4/2004 Marmigere ............ H04L 29/06
709/242
2004/0254921 A1 12/2004 Cohen et al.
(Continued)

FOREIGN PATENT DOCUMENTS

| CN | 1484155 A | 3/2004 |
|----|-----------|--------|
| CN | 101808218 A | 8/2010 |

(Continued)

OTHER PUBLICATIONS

OneM2M TS-0001 V2.3.0, "Functional Architecture" Aug. 7, 2015, pp. 54-78 (Year: 2015).*
(Continued)

Primary Examiner — Ayaz R Sheikh
Assistant Examiner — Sori A Aga
(74) Attorney, Agent, or Firm — Fish & Richardson P.C.

(57) ABSTRACT

Embodiments of the present invention disclose a resource obtaining method and a related device, to effectively reduce redundant data transmission between a registrar and a resource server. The method in the embodiments of the present invention includes: receiving, by a registrar, a first request sent by a terminal for obtaining a target attribute included in a resource, where the first request carries a uniform resource identifier URI of the target attribute; determining, by the registrar based on the URI, that the registrar stores the resource to which the target attribute belongs, where the target attribute is partial content included in the resource; and sending, by the registrar to the terminal, a valid target attribute indicated by the URI. The embodiments of the present invention further provide a registrar and a resource server, effectively reducing redundant data transmission between the registrar and the resource server, and saving a network resource.

8 Claims, 6 Drawing Sheets

(51) Int. Cl.
   *H04L 29/08* (2006.01)
   *G06F 16/957* (2019.01)
   *H04W 48/08* (2009.01)
   *H04W 72/04* (2009.01)

(52) U.S. Cl.
   CPC ......... *H04L 67/2842* (2013.01); *H04W 4/70* (2018.02); *H04W 48/08* (2013.01); *H04W 72/0426* (2013.01); *H04L 67/02* (2013.01); *H04L 67/04* (2013.01); *H04L 67/2828* (2013.01)

(56) References Cited

U.S. PATENT DOCUMENTS

| | | | | |
|---|---|---|---|---|
| 2015/0055557 | A1* | 2/2015 | Dong | H04W 4/70 370/328 |
| 2017/0195451 | A1* | 7/2017 | Backholm | H04L 67/2852 |
| 2018/0167785 | A1* | 6/2018 | Wang | H04W 4/06 |
| 2018/0270314 | A1* | 9/2018 | Mladin | H04L 67/2833 |
| 2019/0230186 | A1* | 7/2019 | Yellin | H04L 67/2847 |

FOREIGN PATENT DOCUMENTS

| | | | |
|---|---|---|---|
| CN | 102843437 | A | 12/2012 |
| CN | 103257973 | A | 8/2013 |
| JP | 2002055870 | A | 2/2002 |
| JP | 2009009592 | A | 1/2009 |
| JP | 2009076093 | A | 4/2009 |
| WO | WO-2013142139 | A2 * | 9/2013 |

OTHER PUBLICATIONS

Office Action issued in Chinese Application No. 201610072844.6 dated Jun. 4, 2019, 11 pages.
Extended European Search Report dated Sep. 20, 2018 in corresponding European Patent Application No. 17746816.2, 8 pgs.
International Search Report, dated Mar. 27, 2017, in International Application No. PCT/CN2017/071939 (4 pp.).
International Search Report dated Mar. 27, 2017 in corresponding International Patent Application No. PCT/CN2017/071939, 7 pgs.
Written Opinion of the International Searching Authority dated Mar. 27, 2017 in corresponding International Patent Application No. PCT/CN2017/071939, 5 pgs.
Office Action issued in Japanese Application No. 2018-558470 dated Jul. 2, 2019, 7 pages (with English translation).

* cited by examiner

RESOURCE OBTAINING METHOD AND RELATED DEVICE

CROSS-REFERENCE TO RELATED APPLICATIONS

This application is a continuation of International Application No. PCT/CN2017/071939, filed on Jan. 20, 2017, which claims priority to Chinese Patent Application No. 201610072844.6, filed on Feb. 2, 2016. The disclosures of the aforementioned applications are hereby incorporated by reference in their entireties.

TECHNICAL FIELD

The present disclosure relates to the communications field, and in particular, to a resource obtaining method and a related device.

BACKGROUND

Machine to Machine (M2M) refers to data transmission from one terminal to another terminal, that is, a machine-to-machine conversation. M2M is intelligent and interactive communication between machines. M2M technologies have been widely applied to more vertical industries and fields as the M2M technologies are developing rapidly. For example, the M2M technologies are applied to industries such as intelligent transportation, agricultural irrigation, smart household, power grid, and meter reading. To meet requirements of different vertical industries on application services, a same M2M platform is developed for an M2M system to implement some common capabilities, for example, data access and storage, data sharing and transmission, group communication, data subscription notification, security, charging, and device management. The M2M system may include a terminal, a registrar, and a resource server. The registrar may be an operator platform, or may be a home gateway. The resource server provides a specifically specified service, and may be a weather server or may be a fleet management server. The terminal obtains a resource from the resource server by using the registrar. The resource is an abstraction of information. Any information that can be named can be used as a resource. For example, a document, a picture, or a time-related service (for example, "weather of Nanjing on Sep. 1, 2015") may be a resource. In an actual application, for example:

A terminal A needs to obtain a resource C, and a terminal B also needs to obtain a resource C. The resource C includes attributes such as specific content, a content size, and a content format. In one case, the resource C that needs to be obtained by the terminal A is the same as the resource C that needs to be obtained by the terminal B. Therefore, the resource server sends the same resource to the registrar twice. In another case, compared with the resource C obtained by the terminal B, the resource C obtained by the terminal A has only some attribute values changed and most of the attribute values are the same. The resource server may send most duplicate data, that is, data whose attribute values are the same, to the registrar a plurality of times. This causes redundant data transmission between the resource server and the registrar, causes a waste of a network resource, and reduces a response speed of the registrar to the terminal.

SUMMARY

Embodiments of the present invention provide a resource obtaining method and a related device, to effectively reduce redundant data transmission between a registrar and a resource server, and save a network resource.

In the embodiments of the present invention, a communications system is provided. The communications system includes a terminal, a registrar, and a resource server. In a specific M2M network deployment, the terminal may correspond to an Application Dedicated Node (ADN), an Application Service Node (ASN), or a Middle Node (MN), and the registrar and the resource server may correspond to an ASN, an MN, or an Infrastructure Node (IN). The registrar (Registrar Common Service Entity, R-CSE for short) is a CSE registered by the terminal. The Common Service Entity (CSE) is used as a common capability component of an M2M system, and may carry a common capability. The resource server (Hosting Common Service Entity, H-CSE for short) is an entity holding a resource or an attribute.

The registrar may support a plurality of terminals. The registrar may be an operator platform, or may be a home gateway. The resource server provides a specifically specified service, and for example, may be a weather server or may be a fleet management server. The terminal may obtain a resource or an attribute of a resource from the resource server by using the registrar. In the embodiments of the present invention, a storage mechanism is introduced to the registrar, to store a resource. When the terminal requests to obtain a target attribute, where the target attribute is a partial attribute included in the resource, the registrar first searches a local storage, to determine whether the resource to which the target attribute belongs is locally stored. If the resource is stored, the registrar directly sends the target attribute included in the locally stored resource to the terminal, without a need to obtain the target attribute from the resource server, thereby effectively reducing data transmission between the registrar and the resource server.

In the embodiments of the present invention, the terminal may need to obtain a resource or a target attribute included in the resource. The following describes a case in which the terminal needs to obtain a target attribute.

According to a first aspect, an embodiment of the present invention provides a resource obtaining method, applied to a machine-to-machine M2M communications system. A registrar receives a first request sent by a terminal for obtaining a target attribute included in a resource, where the first request carries a uniform resource identifier URI of the target attribute. The registrar may determine, based on the URI, that the first request is used to request the target attribute included in the resource. The target attribute is partial content included in the resource. The target attribute is at least one attribute. The registrar determines, based on the uniform resource identifier (English: Uniform Resource Identifier, URI for short), that the registrar stores the resource to which the target attribute belongs. Then, the registrar searches a local storage by using a resource part of the URI as an index, to determine whether the resource to which the target attribute belongs exists in the local storage. When the registrar determines that the resource to which the target attribute belongs is locally stored, the registrar sends, to the terminal, a valid target attribute indicated by the URI. The target attribute herein is a locally stored target attribute in the registrar. The resource herein is obtained after the registrar obtains a response from a resource server and stores the response, after the terminal sends for the first time an obtaining request to the registrar. The resource stored in the registrar is updated, so that data can be updated and stored regularly. Preferably, the data is synchronously updated and stored based on attribute value content that changes and that is subsequently returned by the resource server to the registrar.

By this embodiment of the present invention, a storage mechanism is introduced to the registrar, and when the terminal requests the target attribute from the registrar, the registrar searches a storage by using the resource part of the URI as the index. If determining that the resource to which the target attribute belongs is locally stored, the registrar directly sends the target attribute included in the locally stored resource to the terminal, without a need to obtain the target attribute from the resource server, thereby effectively reducing a data transmission amount between the registrar and the resource server.

Specifically, there are several different cases in which the registrar determines a valid target attribute. The following separately describes the cases.

In a possible design, the resource includes a time attribute used to indicate a validity period of the resource. The registrar may determine, based on the time attribute, whether the resource to which the target attribute belongs has expired. If the resource has not expired, the registrar determines that the valid target attribute is specifically a target attribute indicated by the URI and stored in the registrar. The registrar sends the valid target attribute to the terminal.

In a possible design, if the registrar determines, based on the time attribute, that the resource to which the target attribute belongs has expired, further, the registrar sends a second request to the resource server. The second request is used to obtain the target attribute from the resource server. The second request carries a last modified time attribute value of the resource stored in the registrar and the URI. Subsequently, the registrar receives attribute value content fed back by the resource server, where the attribute value content is specifically attribute value content that is in the target attribute stored in the resource server and that changes relative to the target attribute stored in the registrar, when the last modified time attribute value stored in the registrar is different from a last modified time attribute value stored in the resource server.

The valid target attribute determined by the registrar is specifically: the attribute value content received by the registrar and attribute value content that is in the target attribute stored in the registrar and that does not change.

In this embodiment of the present invention, the registrar first determines, based on the time attribute of the resource, whether the resource has expired, and if the resource has not expired, directly determines that the target attribute included in the locally stored resource that has not expired is the valid target attribute, without the need to obtain the target attribute from the resource server. If the resource has expired, the registrar sends the last modified time attribute value stored in the resource to the resource server, so that the resource server determines, based on the last modified time attribute value, the attribute value content that is in the target attribute stored in the registrar and that changes. The registrar receives the attribute value content sent by the resource server that is in the target attribute and that changes, but does not receive all content of the target attribute. This effectively reduces data transmission between the registrar and the resource server. The registrar determines that the received attribute value content that changes and the locally stored attribute value content that does not change are valid target attributes. The registrar sends the valid target attributes to the terminal.

The case in which the terminal obtains the target attribute from the registrar is described above. The following describes a case in which the terminal needs to obtain a resource.

In a possible design, the registrar receives a third request sent by the terminal for obtaining a resource. The third request carries a URI of the resource. The registrar searches the local storage by using the URI as an index. The registrar determines, based on the URI of the resource, that the resource is locally stored. In addition, the registrar determines, based on a time attribute of the resource, whether the resource has expired. If the resource has expired, the registrar sends a fourth request to the resource server. The fourth request is used to request to obtain the resource from the resource server, and the fourth request carries the URI of the resource and a last modified time attribute value of the resource stored in the registrar. Subsequently, the registrar receives attribute value content fed back by the resource server. The attribute value content includes attribute value content that is of an attribute value in the resource stored in the resource server and that changes relative to the resource stored in the registrar, when a last modified time attribute value stored in the resource server is different from the last modified time attribute value stored in the registrar. The registrar determines that a valid resource is specifically: the received attribute value content that changes and attribute value content that is stored in the registrar and that does not change. The registrar sends the valid resource to the terminal. When receiving the attribute value content that changes, the registrar updates a corresponding attribute value based on the attribute value content that changes and stores the updated attribute value.

In this embodiment of the present invention, if only partial attribute content of the resource stored in the registrar changes, and there is still some partial attribute content that does not change, the registrar receives only the attribute value content that is in the resource and that changes, but does not receive all attribute value content in the resource, thereby reducing data transmitted between the registrar and the resource server.

According to a second aspect, an embodiment of the present invention provides a computer storage medium, configured to store a computer software instruction used by the foregoing registrar, including a program designed for executing the foregoing aspect.

According to a third aspect, an embodiment of the present invention provides a registrar, having a function performed in practice by the registrar in the foregoing method. The function may be implemented by hardware, or may be implemented by hardware executing corresponding software. The hardware or software includes one or more modules corresponding to the foregoing function.

According to a fourth aspect, a structure of a registrar includes a memory, a transceiver, and a processor. The memory is configured to store computer executable program code and is coupled to the transceiver. The program code includes an instruction. When executed by the processor, the instruction causes the registrar to execute information or an instruction in the foregoing method.

According to a fifth aspect, an embodiment of the present invention provides a resource obtaining method, applied to a machine-to-machine M2M communications system. A resource server receives a second request sent by a registrar for obtaining a target attribute included in a resource. The second request carries a URI of the target attribute and a last modified time attribute of the resource. The target attribute is partial content included in the resource. The resource server may determine based on the URI, that the second request is used to request the resource. Further, the resource server determines whether the received last modified time attribute value is the same as a stored last modified time attribute value. When the last modified time attribute value of the resource to which the target attribute belongs is different from the received last modified time attribute value, the resource server compares one by one target attributes requested by the registrar. The resource server determines attribute value content that is in the target attribute stored in the resource server and that changes relative to a target attribute stored in the registrar, and optionally, generates a response based on the attribute value content that changes. By means of this embodiment of the present invention, the resource server compares the requested target attributes one by one, and sends only the attribute value content that changes to the registrar, or if after comparing the requested target attributes one by one, the resource server finds that none of attribute value content in the target attributes changes, the resource server sends the response to the registrar, to indicate that the target attributes do not change, and the resource server does not need to send all the target attributes to the registrar, thereby reducing redundant data transmitted between the resource server and the registrar.

In a possible design, the resource server receives a fourth request sent by the registrar for obtaining a resource. The fourth request carries a URI of the resource and a last modified time attribute value of the resource stored in the registrar. When the resource server determines that a stored last modified time attribute value of the resource is different from the received last modified time attribute value of the resource, the resource server compares all attributes in the requested resource one by one. The resource server determines attribute value content that is in the resource stored in the resource server and that changes relative to the resource stored in the registrar. The resource server sends, to the registrar, the attribute value content that changes.

In this embodiment of the present invention, the resource server compares the received last modified time attribute value with the locally stored last modified time attribute value. If the two last modified time attribute values are different from each other, the resource server further performs comparison to determine an attribute value that is in the resource corresponding to the stored last modified time attribute value and that changes relative to the resource corresponding to the received last modified time attribute value, and sends only the attribute value that changes to the registrar, but does not send all attribute values in the resource to the registrar, thereby greatly reducing redundant information transmission between the registrar and the resource server, and saving a network resource.

According to a sixth aspect, an embodiment of the present invention provides a computer storage medium, configured to store a computer software instruction used by the foregoing resource server, including a program designed for executing the foregoing aspect.

According to a seventh aspect, an embodiment of the present invention provides a resource server. The resource server has a function executed by the resource server for implementing the foregoing method. The function may be implemented by hardware, or may be implemented by hardware executing corresponding software. The hardware or software includes one or more modules corresponding to the foregoing function.

According to an eighth aspect, an embodiment of the present invention provides a resource server. The resource server includes a memory, a transceiver, and a processor. The memory is configured to store computer executable program code and is coupled to the transceiver. The program code includes an instruction. When executed by the processor, the instruction causes the resource server to execute information or an instruction in the foregoing method.

DESCRIPTION OF EMBODIMENTS

Embodiments of the present invention provide a resource obtaining method and a related device, to effectively reduce redundant data transmission between a registrar and a resource server, and improve a speed at which the registrar responds to a terminal.

To make persons skilled in the art understand the technical solutions in the present invention better, the following describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
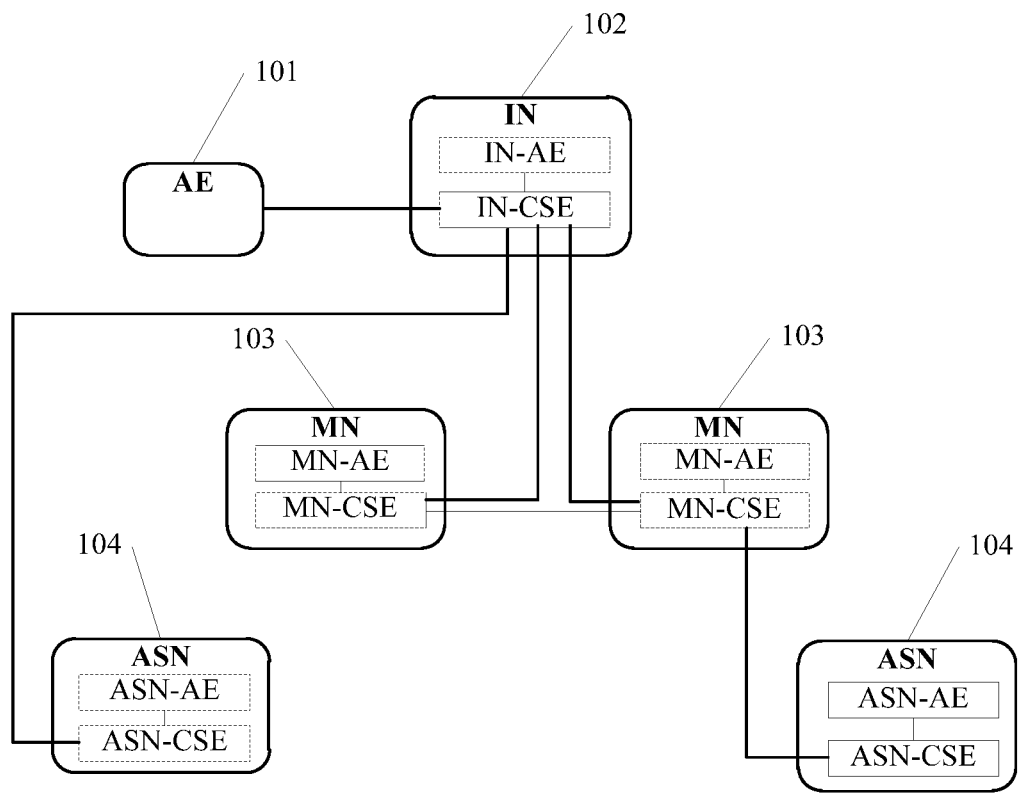
FIG. 1 is a schematic diagram of an M2M system according to an embodiment of the present invention.

FIG. 1 is a schematic architectural diagram of an M2M system according to an embodiment of the present invention. The M2M system includes an M2M platform 102, an M2M gateway 103, an M2M device 104, and an AE (Application Entity, application entity) 101. As shown in FIG. 1, the M2M platform 102 may be an IN (Infrastructure Node, infrastructure node), the M2M gateway 103 is an MN (Middle Node, middle node), the M2M device may be an ASN (Application Service Node, application service node) or an ADN (Application Dedicated Node, application dedicated node) that is not shown in the figure. In addition, a CSE (Common Service Entity, common service entity) is used as a common capability component of the M2M system, and may carry a common capability. The CSE may be included in the M2M platform, the M2M gateway, or the ASN that is used as the M2M device, to implement a corresponding function. The AE may exist independently, or may be included in the M2M platform, the M2M gateway, or the ASN or the ADN that is used as the M2M device. The CSE enables, by using an Mca reference point, the AE to access a common capability opened by the CSE, implements communication between CSEs by using an Mcc reference point, and implements invoking of an underlying network capability by using an Mcn reference point.

Figure 2:
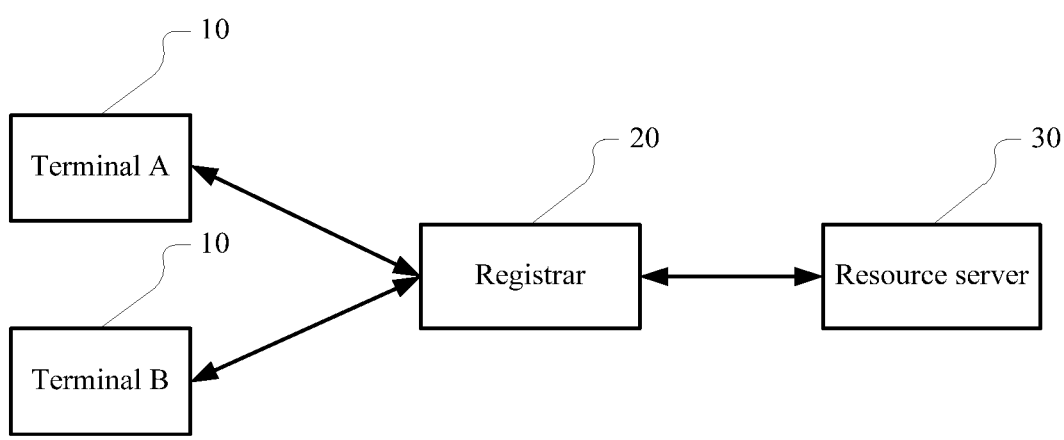
FIG. 2 is a schematic diagram of a communications system according to an embodiment of the present invention.

In an embodiment of the present invention, FIG. 2 is a schematic diagram of a communications system, including a terminal 10, a registrar 20, and a resource server 30. The registrar 20 (English: Registrar Common Service Entity, R-CSE for short) is a CSE registered by the terminal. The resource server 30 (English: Hosting Common Service Entity, H-CSE for short) is an entity holding a resource or an attribute. It should be noted that the terminal 10, the registrar 20, and the resource server 30 in this embodiment of the present invention correspond to the entities of the M2M system in FIG. 1, as shown in the following Table 1:

TABLE 1

| | |
|---|---|
| Terminal | ADN (including at least one AE) ASN (including at least one AE) MN (a middle node, such as a gateway) |
| Registrar (R-CSE) | ASN, MN, and IN |
| Resource server (H-CSE) | ASN, MN, and IN |

As shown in the foregoing Table 1, in an actual network deployment, the terminal may correspond to the ADN, the ASN, or the MN, and the registrar 20 and the resource server 30 may correspond to the ASN, the MN, or the IN. It should be noted that the resource obtaining method in the embodiments of the present invention not only is applicable to a scenario in which the terminal obtains a resource from the resource server by using the registrar, but also is applicable to a scenario in which the AE obtains a resource from the resource server by using the registrar. The AE may be an independently deployed IN-AE node (such as an application server on a platform side, or an application server deployed in cloud), or may be a logic functional unit located in the ADN, in a terminal of an ASN type, or in an MN gateway. In this embodiment of the present invention, the resource obtaining method and a process are described by using the terminal as an example. A person of ordinary skill in the art should understand that the method is also applicable to a scenario in which an AE in any form obtains a resource from the resource server by using the registrar.

The registrar may support a plurality of terminals 10. The registrar 20 may be an operator platform, or may be a home gateway. The resource server 30 provides a specifically specified service, and may be a weather server or may be a fleet management server. The terminal 10 may obtain a resource or an attribute of a resource from the resource server 30 by using the registrar 20.

Figure 3:
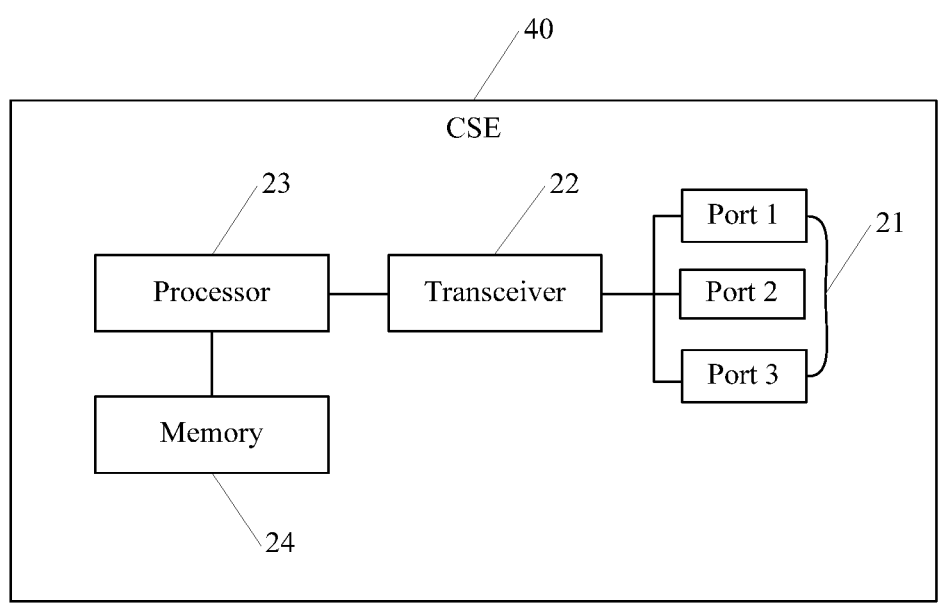
FIG. 3 is a schematic structural diagram of a CSE in an M2M system according to an embodiment of the present invention.

FIG. 3 is a schematic structural diagram of a CSE 40 in an M2M system according to an embodiment of the present invention. The CSE 40 may be an R-CSE, or may be an H-CSE. The CSE 40 may include one or more ports 21, and is coupled to a transceiver (transceiver) 22. The transceiver 22 may be a transmitter, a receiver, or a combination of a transmitter and a receiver, and sends or receives a data packet to or from another network node by using the port 21. The processor 23 is coupled to the transceiver 22 and is configured to process a data packet. The processor 23 may include one or more multi-core processors 23 and/or memories 24. The processor 23 may be a general purpose processor 23, an application-specific integrated circuit (application specific integrated circuit, ASIC for short), or a digital signal processor (English: digital signal processor, DSP for short) 23.

The memory 24 may be a non-transitory storage medium, is coupled with the processor 23, and is configured to store different types of data, such as a semantically described resource, or a resource described by a semantically described resource. The memory 24 may include a read only memory 24 (English: read only memory, ROM for short), a random access memory 24 (English: random access memory, RAM for short), another type of dynamic storage device that can store information and an instruction, or a magnetic disk memory 24. The memory 24 may be configured to store an instruction for implementing a method related to semantic verification. It may be understood that programming is performed in the processor 23, an executable instruction is loaded to the memory 24, and the memory 24 is at least one of a read-only memory or a random access memory.

In an embodiment when used as a registrar (R-CSE), the CSE 40 includes the memory 24, the processor 23, the transceiver 22, and the one or more ports 21 coupled to the transceiver 22. The memory 24 is configured to store computer executable program code. The processor 23 is coupled to the memory 24 and the transceiver 22.

The program code includes an instruction. When executed by the processor 23, the instruction causes the registrar to perform related steps in FIG. 5 and FIG. 6.

In addition, when used as a resource server (R-CSE), the CSE 40 includes the memory 24, the processor 23, the transceiver 22, and the one or more ports 21 coupled to the transceiver 22. The memory 24 is configured to store computer executable program code. The processor 23 is coupled to the memory 24 and the transceiver 22.

The program code includes an instruction. When executed by the processor 23, the instruction causes the resource server to perform related steps in FIG. 5 and FIG. 6.

In the M2M system, an object to be operated appears in a form of a resource. A resource is an abstract form of expression of information. Any information that can be named can be used as a resource, for example, a document, a picture, or a time-related service (for example, "weather of Nanjing on Sep. 1, 2015"). Generally, a uniform resource identifier (English: Uniform Resource Identifier, URI for short) is used to identify a specific resource. Each resource has a unique address (URI). The resource may manage the URI by means of CRUD (create/retrieve/update/delete), respectively corresponding to create, retrieve, update, and delete.

The resource may include a child resource and an attribute, and the child resource may also include an attribute. A difference between the resource and the attribute lies in that the attribute no longer includes a subordinate child resource or attribute but the resource includes a subordinate child resource or attribute.

Figure 4:
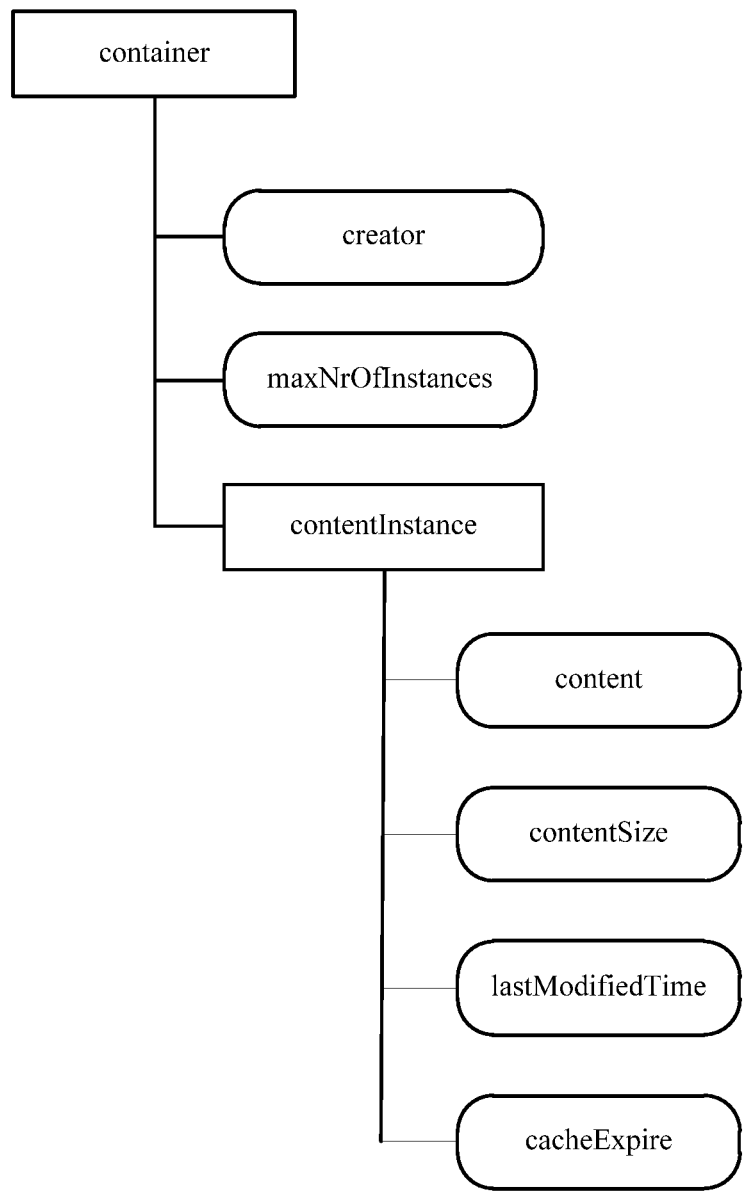
FIG. 4 is a schematic structural diagram of resource data according to an embodiment of the present invention.

In this embodiment of the present invention, refer to a structural diagram of resource data shown in FIG. 4. A square-head elongated box in FIG. 4 indicates a resource, and a round-head elongated box indicates an attribute. A resource "container" (container) may store data, and is mainly configured to: share data with another entity and track the data. A container instance (contentInstance) is a child resource, and a creator (creator) and a maximum quantity of instances (maxNrOfInstances) are used as attributes of the container resource. Specific content (content), a content size (contentSize), a last modified time (lastModifiedTime), and a time (cacheExpire) are used as attributes included in the container instance of the child resource. An attribute is a specific description of the resource, and is used to store specific data of the resource. One attribute has a name-value pair (name-value pair). For example, a name-value pair of an attribute creator is expressed as creator=Sam, indicating that the creator is a person named Sam. If there is information that needs to be shared, a container resource is created, and the information is added to a content attribute of a child resource contentInstance of the container resource. Weather information sharing, peasant crop growing information sharing, or the like is included.

In this embodiment of the present invention, a storage mechanism is introduced to the registrar, to store a resource. When the terminal obtains a resource or obtains a target attribute, the target attribute is a partial attribute included in the resource, that is, the target attribute may be at least one attribute. In an example, the terminal obtains the target attribute, and when the terminal sends a request for obtaining the target attribute to the registrar, the registrar may search a local storage. When the registrar determines that the resource to which the target attribute belongs has been stored, the registrar sends a valid target attribute to the terminal. The valid target attribute is a target attribute stored in the registrar when a time (cacheExpire) attribute indicates that the resource to which the target attribute belongs has not expired. Optionally, when the time (cacheExpire) attribute indicates that the resource to which the target attribute belongs has expired, the registrar sends a last modified time (lastModifiedTime) attribute value of the resource to the resource server. When determining that the received last modified time (lastModifiedTime) attribute value is different from a last modified time attribute value stored in the resource server, the resource server sends, to the registrar, an attribute value that is in a target attribute corresponding to the locally stored last modified time attribute value and that changes relative to a target attribute corresponding to the received last modified time attribute value. For ease of understanding, attribute value content in FIG. 4 such as specific content (content), a content size (contentSize), a last modified time (lastModifiedTime), or an expiration time (cacheExpire) is described by using an example:

| Attribute | Attribute value |
|---|---|
| lastModifiedTime | Tuesday, 2015-9-29, 04:51:59 Greenwich Mean Time |
| contentSize | 1k |
| content | cloudy (cloudy) |
| cacheExpire | Tuesday, 2015-9-29, 06:00:00 Greenwich Mean Time |

Figure 5:
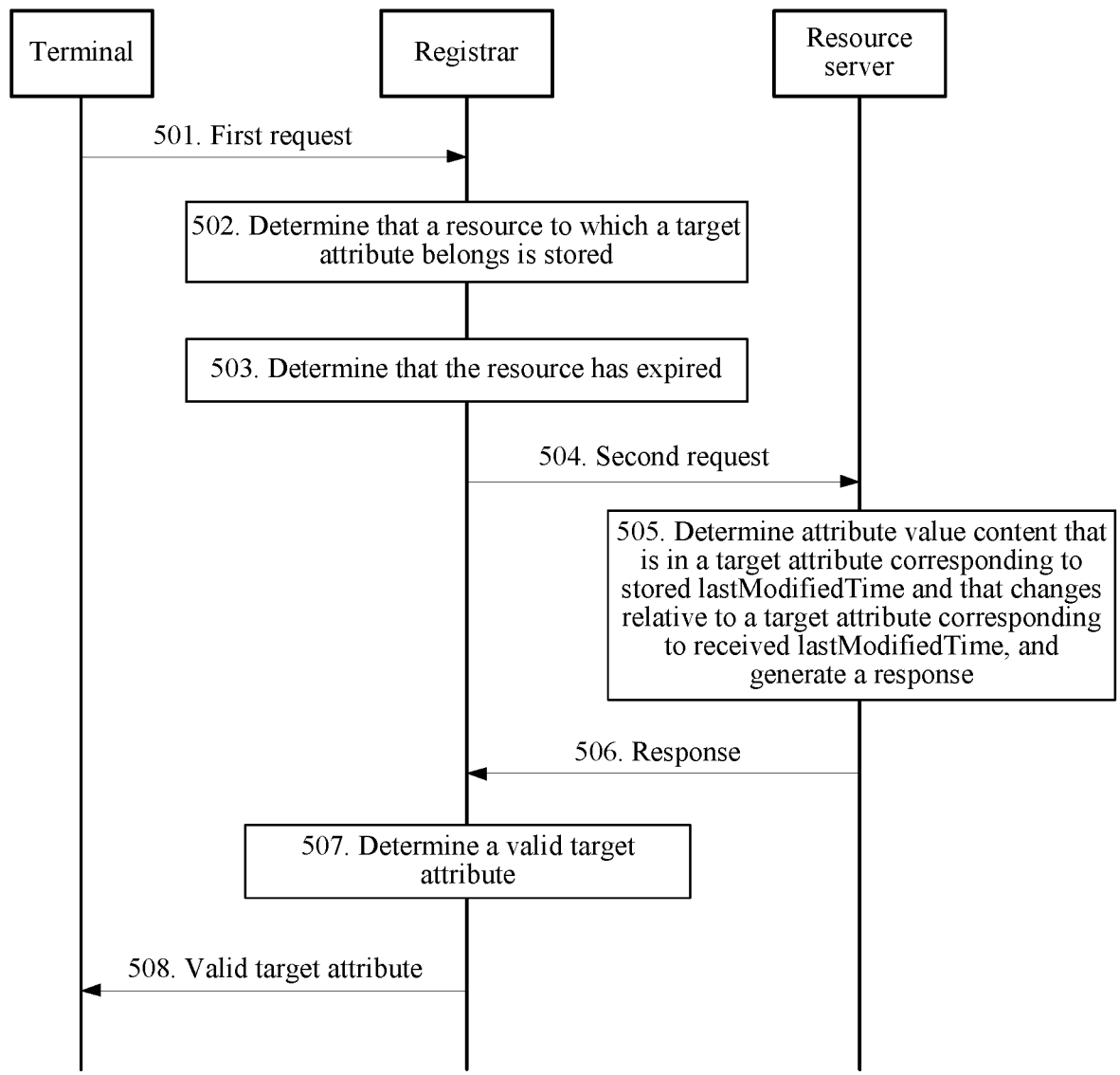
FIG. 5 is a schematic diagram of an embodiment of a resource obtaining method according to embodiments of the present invention.

The following specifically describes embodiments based on whether the terminal requests to obtain all content of a resource (that is, the resource), or partial content (a target attribute) of the resource. Referring to FIG. 5, this embodiment provides a resource obtaining method, including the following steps.

1. A terminal requests to obtain a target attribute.

501. The terminal sends a first request to a registrar for obtaining the target attribute, where the first request carries a uniform resource identifier URI of the target attribute.

The target attribute may be at least one attribute. This is not limited herein. For ease of understanding, the following provides a description by using an example.

For example, the terminal obtains weather information.

The terminal sends a first request to the registrar, where the first request requests attributes 'content' and 'content size' of a resource contentInstance.

The first request may be:

GET /m2m.provider.com/CSE221/container/contentinstance?atr=con&atr=cs HTTP/1.1, where GET represents an obtaining operation, complying with a version HTTP/1.1.

A URI carried in the first request is:

/m2m.provider.com/CSE221/container/contentinstance?atr=con&atr=cs, where /m2m.provider.com/CSE221/container/contentinstance represents a resource part of the URI, 'con' represents an attribute 'content' of a resource indicated by the resource part of the URI, and cs represents an attribute content size of the resource indicated by the resource part of the URI.

502. The registrar receives the first request, and determines, based on a resource part of the URI, that the registrar stores a resource to which the target attribute belongs.

The registrar receives the URI carried in the first request. First, the registrar parses the URI. The registrar may determine the resource part and/or an attribute part of the URI in the first request by parsing the URI.

For example, the URI carried in the first request in step 501 is parsed as follows:

In /m2m.provider.com/CSE221/container/contentinstance?atr=con&aft=cs, the resource part and the attribute part of the URI may be classified and distinguished based on a boundary character "?" between the two parts. The part before "?" is the resource part, and for the part after "?", it may be determined, based on "atr", that an attribute is requested.

In this case, the resource part is '/m2m.provider.com/CSE221/container/contentinstance', and it may be determined, based on 'atr=con&atr=cs', that the attribute requested by using the first request is an attribute content and an attribute content size of the resource.

Similarly, if the URI carried in the first request is:

'/m2m.provider.com/CSE221/container/contentinstance' without the character "?", it indicates that the first request is used to request a resource.

In conclusion, in this embodiment, the first request is used to request a target attribute.

Second, the registrar searches a local storage by using the resource part of the URI as an index, to determine whether the resource to which the target attribute belongs is locally stored.

For example, the registrar uses the resource part of the URI:

'/m2m.provider.com/CSE221/container/contentinstance' as an index to search the local storage, determines that the resource to which the target attribute belongs exists in the local storage, and determines, based on atr=con&atr=cs, that the target attribute requested by the terminal is content and content size.

It may be understood that the resource to which the target attribute belongs and that is stored in the registrar is stored by the registrar based on a resource requested for the first time by the terminal. That is, when receiving a request sent by any terminal for obtaining a resource, the registrar determines, based on a requested URI, that the resource is not locally stored. After obtaining, from a resource server, the resource requested by the terminal, the registrar stores, based on a determined result that the resource is not locally stored, a response obtained from the resource server in the registrar.

The response that is stored in the registrar and that includes the resource to which the target attribute belongs is as follows:

```
HTTP/1.1 200 OK              /indicating a successful response of 200 OK, complying
with the version HTTP/1.1.
  Content-Type: application/xml         /indicating that a content format of a
message body is XML.
  Date: Tue, 29 Sep 2015 05: 51: 59 GMT        /indicating that a message sending time is:
Tuesday, September 29, 2015, 05:51:59 Greenwich Mean Time.
    <?xml version="1.0" encoding="UTF-8"?>
    <contentInstance>                    /indicating that a partial update starts.
      <lastModifiedTime> Tue, 29 Sep 2015 04:51:59 GMT </lastModifiedTime>
    <contentSize>1k</contentSize>        /indicating that an attribute value of contentSize is
"1k".
    <content>cloudy</content>            /indicating that an attribute value of content is "cloudy".
    <cacheExpire> Tue, 29 Sep 2015 06:00:00 GMT </cacheExpire>
    /indicating that an attribute value of cacheExpire is Tuesday, September 29, 2015,
06:00:00 Greenwich Mean Time.
    <contentInstance>                    /indicating that a resource part ends.
```

In another manner, the registrar may further store, based on an attribute value cacheExpire added by the resource server to the sent resource, the resource obtained from the resource server. Specifically, after the resource server receives at least two requests for a same resource, when determining that a quantity of the requests for the same resource reaches a preset value, the resource server adds the attribute value cacheExpire to a response to be sent to the registrar, to instruct the registrar to store the response including the resource.

503. The registrar determines that the resource to which the target attribute belongs and that is indicated by the URI has expired.

The registrar determines, based on the cacheExpire attribute value, whether the resource to which the target attribute belongs has expired. If the resource has expired, the target attribute has expired. The cacheExpire attribute value may be absolute time (for example, Sep. 9, 2015, 05:43:02 Greenwich Mean Time), or may be relative time (for example, 600 s). This is not limited herein.

That the registrar compares a current time with the cacheExpire attribute value to determine whether the resource to which the target attribute belongs has expired is described below by using an example.

If the cacheExpire attribute value is: Sep. 9, 2015, 05:43:02 Greenwich Mean Time, and a current time at which the first request is received is: Sep. 9, 2015, 05:45:02 Greenwich Mean Time, it is determined that the target attribute in the storage has expired. For another example, the cacheExpire attribute value is relative time, that is, cacheExpire: 600 s, a time at which the registrar stores the resource is: Sep. 9, 2015, 05:33:02 Greenwich Mean Time, and a current time at which the registrar receives the first request is: Sep. 9, 2015, 05:55:02 Greenwich Mean Time, the target attribute in the storage has expired.

A principle of determining, by the registrar, that the resource has not expired is the same as a principle of determining that the resource has expired. Details are not described herein by using any example.

504. The registrar sends a second request to a resource server, where the second request carries an attribute value of lastModifiedTime of the resource stored in the registrar and the URI.

For example, the second request is as follows:

GET/m2m.provider.com/CSE221/container/contentinstance?atr=con&atr=cs HTTP/1.1

LastModifiedTime: Tue, 29 Sep. 2015 04:51:59 GMT where a header field of the second request carries lastModifiedTime, and an attribute value of lastModifiedTime is: Tuesday, Sep. 29, 2015, 04:51:59 Greenwich Mean Time.

The URI carried in the first request is:

/m2m.provider.com/CSE221/container/contentinstance?atr=con&atr=cs, and a description of '/m2m.provider.com/CSE221/container/contentinstance?atr=con&atr=cs' is the same as the description in step 501. Details are not described herein.

505. The resource server receives the second request, where the second request carries the uniform resource identifier URI of the target attribute and the attribute value of lastModifiedTime of the resource.

It may be understood that the resource to which the target attribute belongs and that is stored in the resource server is as follows:

```
<contentInstance>                    /indicating that a resource part starts.
  <lastModifiedTime> Tue, 29 Sep 2015 05:51:59 GMT </lastModifiedTime>
  /indicating that an attribute value of lastModifiedTime is Tuesday, September 29, 2015,
05:51:59 Greenwich Mean Time.
    <contentSize>1k</contentSize>        /indicating that an attribute value of
contentSize is "1k".
    <content>raining</content>           /indicating that an attribute value of
content is "raining".
```

```
<cacheExpire> Tue, 29 Sep 2015 07:00:00 GMT </cacheExpire>
 /indicating that an attribute value of cacheExpire is Tuesday, September 29, 2015,
07:00:00 Greenwich Mean Time.
    ...
<contentInstance>                /The resource part ends.
```

The resource server determines whether the attribute value of lastModifiedTime stored in the resource server is the same as a received attribute value of lastModifiedTime. When the attribute value of lastModifiedTime of the resource to which the target attribute belongs is different from the received attribute value of lastModifiedTime, there are two cases:

(1). The resource server compares one by one target attributes requested by the registrar. The resource server determines attribute value content that is in the target attribute stored in the resource server and that changes relative to the target attribute stored in the registrar, and generates a response based on the attribute value content that changes.

(2). Optionally, after comparing one by one the requested target attributes, the resource server determines that none of target attributes stored in the resource server change relative to the target attribute stored in the registrar.

The following describes the case (1) by using an example: the second request obtains content and content in the resource indicated by size/m2m.provider.com/CSE221/container/contentinstance, and the target attribute includes attributes 'content' and 'content size', referring to Table 2:

TABLE 2

| Request attribute | lastModifiedTime stored in the resource server 2015-9-29, 05:51:59 | lastModifiedTime received by the resource server 2015-9-29, 04:51:59 |
| --- | --- | --- |
| content size | 1k | 1k |
| content | raining | cloudy |

It can be learned from the foregoing Table 2 that attribute values of lastModifiedTime are different. It should be noted that the resource server stores different resource versions corresponding to the different attribute values of lastModifiedTime, for content comparison between the different resource versions. Although the versions are different, not all attribute values in the versions change, and only some attribute values may change.

It should be noted that there are two methods for determining, by the resource server, the attribute value content that is in the target attribute stored in the resource server and that change relative to the target attribute stored in the registrar. In a first method, attribute values of the attributes are directly compared. As shown in Table 2, attribute values of 'content size' do not change, and both are '1K', and attribute values of 'content' change, where one is 'raining', and the other is 'cloudy'.

In a second method, update times of the attributes are compared. That is, each attribute corresponds to an update time. Referring to Table 3, the update time is a status value of a flag bit of each attribute, and each attribute has an update time.

TABLE 3

| Request attribute | lastModifiedTime stored in the resource server 2015-9-29, 05:51:59 | lastModifiedTime received by the resource server 2015-9-29, 04:51:59 |
| --- | --- | --- |
| content size | 1k, an update time: 2015-9-29, 02:31:03 | 1k, an update time: 2015-9-29, 02:31:03 |
| content | raining, an update time: 2015-9-29, 05:51:59 | cloudy, an update time: 2015-9-29, 04:51:59 |

In the second method, the resource server does not need to compare attribute values, but compares update times of the attribute values. It may be learned from the foregoing Table 3 that the update times corresponding to 'content size' are the same, and the update times corresponding to 'content' are different. Therefore, attribute value content that is in the target attribute stored in the resource server and that changes relative to an update time stored in the registrar is 'content=raining', and attribute value content that does not change is 'content size=1 K'.

It may be understood that results of the comparison for the attribute values that is performed by the resource server are the same, but methods for the comparison are different. In the first method, the attribute values of the attributes are directly compared, but in the second method, the update times of the attribute values are compared.

506. The resource server sends a response to the registrar, where the response includes attribute value content that changes.

Optionally, the resource server may directly send, to the registrar, the attribute value content that changes. A specific manner is not limited herein.

For the foregoing case (1), a message sending time generated by the resource server is 'Tue, 29 Sep. 2015 06: 01: 59 GMT', and a response is generated based on the attribute value content that is in the target attribute requested by using the second request and that changes. The response generated by the resource server is as follows:

```
HTTP/1.1 200 OK           /indicating a successful response of 200 OK, complying
with the version HTTP/1.1.
    Content-Type: application/xml    /indicating that a content format of a message
body is XML.
    Date: Tue, 29 Sep 2015 06:01:59 GMT
    indicating that the message sending time is: Tuesday, September 29, 2015, 06:01:59
Greenwich Mean Time.
    <?xml version="1.0" encoding="UTF-8"?>
    <partialUpdate>          /indicating that a partial update starts.
```

```
    <contentInstance>
        <content>raining</content>      /indicating that an attribute value of content
is "raining".
        <contentInstance>               /indicating that the resource part ends.
    </partialUpdate>                    /indicating that the partial update ends.
```

Optionally, for the case (2), the resource server generates identifier information, where the identifier information indicates that the attribute value content that changes is an empty set.

Optionally, the identifier information may be added to the response, the response indicates that the target attribute does not change, and the response is as follows:

HTTP/1.1 304 Not Modified indicating that a returned 304 response indicates that the target attribute requested by using the second request does not change.

Date: Tue, 29 Sep. 2015 06:01:59 GMT indicating that the message sending time is: Tuesday, Sep. 29, 2015, 06:01:59 Greenwich Mean Time.

Optionally, the resource server may indicate, by using a different status code, for example, 3xy, that the target attribute does not change.

507. The registrar receives the response, and determines a valid target attribute.

Optionally, the valid target attribute may be added to a new response.

For the case (1) in step 506, the valid target attribute is the received attribute value content that changes and attribute value content that is in the target attribute stored in the registrar and that does not change.

It may be understood that the registrar receives the response, and determines, based on an indication of the response (partialUpdate), or by using a specific response status code (for example, 3xz partial update), that the response is a partial update response.

The registrar modifies a response message sending time to a current time, for example, modifies the message sending time to a current time "Date: Tue, 29 Sep. 2015 06:01:59 GMT", and adds, to the received response, locally stored attribute value content 'contentSize' that does not change, to generate a new response.

Optionally, the registrar modifies a response message sending time to a current time, for example, modifies the message sending time to a current time "Date: Tue, 29 Sep. 2015 06:01:59 GMT", copies the response of the resource stored in the registrar, deletes an attribute in the resource to which the target attribute belongs other than the target attribute from the copied version, and changes the attribute value of 'content' from 'cloudy' to 'raining', to generate a new response. An example of the new response is as follows:

```
    HTTP/1.1 200 OK                     /indicating a successful response of 200 OK,
complying with the version HTTP/1.1.
    Content-Type: application/xml       /indicating that a content format of a
message body is XML.
    Date: Tue, 29 Sep 2015 06:01:59 GMT
    indicating that the message sending time is: Tuesday, September 29, 2015, 06:01:59
Greenwich Mean Time.
    <?xml version="1.0" encoding="UTF-8"?>
    <contentInstance>                   /indicating that a resource part starts.
        <contentSize>1k</contentSize>   /indicating that an attribute value of
contentSize is "1k".
        <content>raining</content>      /indicating that an attribute value of content
is "raining".
    <contentInstance>                   /indicating that the resource part ends.
```

It can be learned from the foregoing example of the new response, the valid target attribute is the received attribute value content (content=raining) that changes and attribute value content (contentSize=1k) that is in the target attribute stored in the registrar and that does not change.

For the case (2) in step 506, the valid target attribute is the target attribute stored in the registrar.

It may be understood that when the registrar receives the identifier information, and the attribute value content that is indicated by the identifier information and that changes is an empty set, the registrar determines, based on the identifier information, that the target attribute in the stored resource indicated by the URI does not change.

Optionally, the registrar receives a response, and determines, based on an indication of the response (for example, 304 Not Modified), that the requested target attribute does not change. The registrar generates a new response based on the stored response and the requested attribute value, and modifies a sending time of the new response message to a current time, for example, modifies a message sending time to a current time 'Date: Tue, 29 Sep. 2015 06:01:59 GMT'. The registrar copies the resource, deletes an attribute other than the target attribute in the resource from the copied version, and generates a new response based on the attribute value 'contentSize' and the attribute value 'content' in a response of the copied version. The new response is shown as follows:

```
    HTTP/1.1 200 OK                     /indicating a successful response of 200 OK, complying
with the version HTTP/1.1.
```

```
    Content-Type: application/xml    /indicating that a content format of a
message body is XML.
    Date: Tue, 29 Sep 2015 06:01:59 GMT
    indicating that the message sending time is: Tuesday, September 29, 2015, 06:01:59
Greenwich Mean Time.
    <?xml version="1.0" encoding="UTF-8"?>
    <contentInstance>                  /indicating that a resource part starts.
       <contentSize>1k</contentSize>   /indicating that an attribute value of
contentSize is "1k".
       <content>cloudy</content>       /indicating that an attribute value of content
is "cloudy".
    <contentInstance>                  /indicating that the resource part ends.
```

It can be learned from the foregoing example of the new response that the valid target attribute is the target attributes (contentSize=1k and content=cloudy) stored in the registrar.

508. The registrar sends the valid target attribute to the terminal.

The registrar may directly send the valid target attribute to the terminal.

Optionally, the valid target attribute is added to the response, and after modifying a message sending time, the registrar sends the response to the terminal.

A specific sending manner is not limited herein.

It should be noted that step 503 to step 507 are a case in which the resource to which the target attribute belongs and that is stored in the registrar has expired.

Optionally, if the registrar determines, based on the cacheExpire attribute value, that the resource to which the target attribute belongs has not expired, the valid target attribute is attribute value content that is indicated by the URI stored in the registrar and that has not expired. The registrar directly generates a response by using the locally stored target attributes (content and contentSize) and based on the target attribute requested by the terminal, and returns the response to the terminal.

The registrar may send the stored target attribute to the terminal, or may add the target attribute to a response and send the response to the terminal. A specific send manner is not limited.

The registrar modifies a message sending time and generates a response based on the stored target attribute. The response is as follows:

```
    HTTP/1.1 200 OK             /indicating a successful response of 200 OK, complying
with the version HTTP/1.1.
    Content-Type: application/xml    /indicating that a content format of a
message body is XML.
    Date: Tue, 29 Sep 2015 06:01:59 GMT
    indicating that the message sending time is: Tuesday, September 29, 2015, 06:01:59
Greenwich Mean Time.
    <?xml version="1.0" encoding="UTF-8"?>
    <contentInstance>                  /indicating that a resource part starts.
       <contentSize>1k</contentSize>   /indicating that an attribute value of
contentSize is "1k".
       <content>cloudy</content>       /indicating that an attribute value of content
is "cloudy".
    <contentInstance>                  /indicating that the resource part ends.
```

The valid target attribute is a target attribute included in the resource that is indicated by the cacheExpire attribute value and that has not expired.

In this embodiment, a storage mechanism is introduced to the registrar, and when the terminal requests the target attribute from the registrar, the registrar searches a storage by using the resource part of the URI as the index. If determining that the resource to which the target attribute belongs is locally stored, the registrar determines, based on the cacheExpire attribute value of the resource, whether the resource has expired. If the resource has not expired, the registrar sends the stored target attribute to the terminal, without a need to obtain the resource from the resource server, thereby greatly reducing data transmission between the resource server and the registrar. Further, if the registrar determines that the resource has expired, the registrar sends the attribute value of lastModifiedTime of the resource to the resource server. The resource server compares the received attribute value of lastModifiedTime with a latest attribute value of lastModifiedTime, and if the two attribute values of lastModifiedTime are different, the resource server further determines attribute value content that is in a target attribute corresponding to the stored attribute value of lastModifiedTime and that changes relative to a target attribute corresponding to the received attribute value of lastModifiedTime, and sends, to the registrar, only the attribute value content that changes, but does not send all attribute value content in the target attribute to the registrar, thereby greatly reducing redundant information transmission between the registrar and the resource server, and saving a network resource.

2. A terminal requests to obtain a resource.

Figure 6:
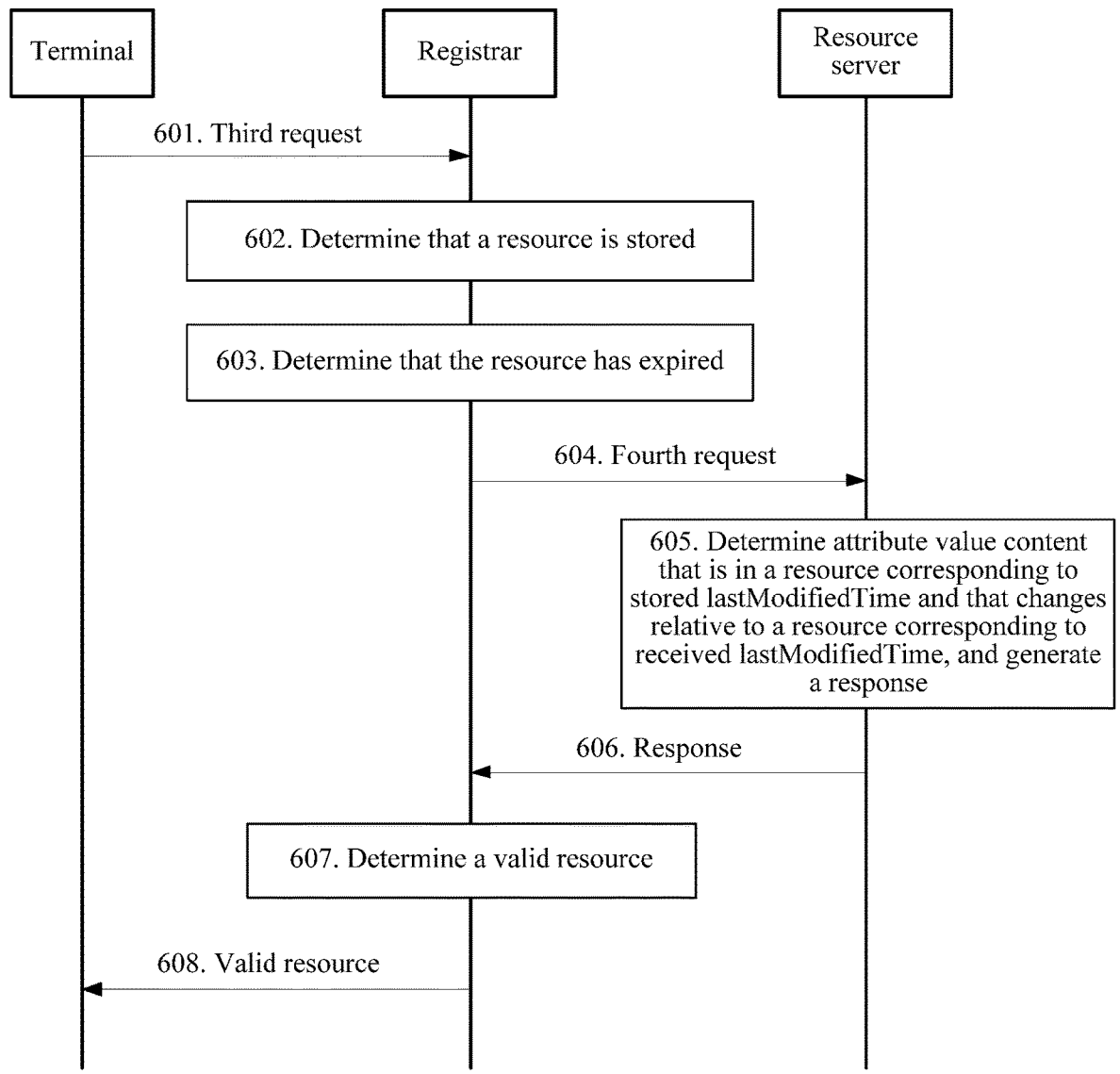
FIG. 6 is a schematic diagram of another embodiment of a resource obtaining method according to embodiments of the present invention.

Referring to FIG. 6, the present invention provides a resource obtaining method, including the following steps.

601. The terminal sends a third request to a registrar for obtaining a resource, where the third request carries a uniform resource identifier URI of the resource.

For example, the terminal obtains weather information.

The terminal sends the third request to the registrar, where the third request is used to request to obtain a resource <contentInstance>.

The third request is as follows:

GET /m2m.provider.com/CSE221/container/contentinstance HTTP/1. 1.

The URI carried in the third request is:
/m2m.provider.com/CSE221/container/contentinstance.
For descriptions of the third request and the URI, refer to the description in step 501 in the foregoing embodiment. Details are not described herein again.

602. The registrar receives the third request, and determines, based on the URI, that the registrar stores the resource.

The registrar receives the URI carried in the third request, parses the URI, and determines that the terminal requests the resource. For a description of parsing the URI and determining that the resource is requested, refer to step 502 in the foregoing embodiment. Details are not described herein again.

The registrar searches a local storage by using the resource part of the URI as an index, to determine whether the resource requested by using the third request is locally stored.

For example, the registrar uses the resource part of the URI:
'/m2m.provider.com/CSE221/container/contentinstance'
as an index to search the local storage, and determines that the resource contentinstance exists in the local storage. Attribute value content included in the resource stored in the registrar is shown in the following Table 4:

TABLE 4

| Attribute | Attribute value |
| --- | --- |
| lastModifiedTime | Tuesday, 2015-9-29, 04:51:59 |
| contentSize | 1k |
| content | cloudy |
| cacheExpire | Tuesday, 2015-9-29, 06:00:00 |

603. The registrar determines that the resource indicated by the URI has expired.

The registrar determines, based on the cacheExpire attribute value, that the resource has expired. For a description of determining, based on the cacheExpire attribute value, whether the resource has expired, refer to step 503 in the foregoing embodiment. Details are not described herein again.

604. The registrar sends a fourth request to a resource server, where the fourth request carries an attribute value of lastModifiedTime of the resource stored in the registrar and the URI.

The fourth request is as follows:
GET /m2m.provider.com/CSE221/container/contentinstance HTTP/1.1
LastModifiedTime: Tue, 29 Sep. 2015 04:51:59 GMT
where a header field of the fourth request carries lastModifiedTime, and the attribute value of lastModifiedTime is: Tuesday, Sep. 29, 2015, 04:51:59 Greenwich Mean Time.

The URI carried in the fourth request is:
/m2m.provider.com/CSE221/container/contentinstance.
For descriptions of the fourth request and the URI, refer to the description in step 501 in the foregoing embodiment. Details are not described herein again.

605. The resource server receives the fourth request, where the fourth request carries the uniform resource identifier URI of the resource and the attribute value of lastModifiedTime of the resource.

The resource server determines whether a locally stored attribute value of lastModifiedTime is the same as the received attribute value of lastModifiedTime. When the attribute value of lastModifiedTime of the resource is different from the received attribute value of lastModifiedTime, the resource server compares one by one all attributes in the requested resource. The resource server determines attribute value content that is in a resource stored in the resource server and that changes relative to the resource stored in the registrar.

Optionally, the resource server generates a response based on attribute value content that changes.

The fourth request is used to request a resource. The resource includes attributes 'contentSize', 'content', 'lastModifiedTime', and 'cacheExpire'. In a specific actual application, attributes included in the resource are not limited to four attributes. This is merely an example for description in this embodiment, instead of a limitation. Refer to Table 5:

TABLE 5

| Request attribute | lastModifiedTime stored in the resource server 2015-9-29, 05:51:59 | lastModifiedTime received by the resource server 2015-9-29, 04:51:59 |
| --- | --- | --- |
| contentSize | 1k | 1k |
| content | raining | cloudy |
| cacheExpire | 2015-9-29, 07:00:00 | 2015-9-29, 06:00:00 |

It can be learned from the foregoing Table 5 that attribute values of lastModifiedTime are different. There are two methods for determining, by the resource server, the attribute value that is in the resource stored in the resource server and that changes relative to the resource stored in the registrar. In a first method, attribute values of the attributes are directly compared. As shown in Table 5, attribute values of contentSize do not change, and both are "1K", and attribute values of "content" change, where one is "raining", and the other is "cloudy". The attribute values of "cacheExpire" change, where one is "2015-9-29, 06:00:00", and the other is "2015-9-29, 07:00:00". The attribute values of "lastModifiedTime" change, where one is 2015-9-29, 05:51:59, and the other is 2015-9-29, 04:51:59.

In a second method, update times of the attributes are compared. That is, each attribute of the resource corresponds to an update time. Referring to Table 6, the update time is a status value of a flag bit of each attribute, and each attribute has an update time.

TABLE 6

| Request attribute | lastModifiedTime stored in the resource server 2015-9-29, 05:51:59 | lastModifiedTime received by the resource server 2015-9-29, 04:51:59 |
| --- | --- | --- |
| contentSize | 1k, an update time: 2015-9-29, 02:31:03 | 1k, an update time: 2015-9-29, 02:31:03 |
| content | raining, an update time: 2015-9-29, 05:51:59 | cloudy, an update time: 2015-9-29, 04:51:59 |
| cacheExpire | 2015-9-29 07:00:00, an update time: 2015-9-29 05:51:59 | 2015-9-29 06:00:00, an update time: 2015-9-29 04:51:59 |

In the second method, the resource server does not need to compare attribute values of attributes, but compares update times of the attribute values. It should be noted that for lastModifiedTime, an update time and an attribute value of lastModifiedTime are the same. It can be learned from the foregoing Table 6 that update times corresponding to "contentSize" are the same, update times corresponding to 'content' are different, update times corresponding to "cacheExpire" are different, and update times of lastModifiedTime are different. Therefore, the attribute value content that is in the resource stored in the resource server and whose update time changes relative to the resource stored in the registrar is: content=raining, cacheExpire=2015-9-29 07:00:00, and lastModifiedTime=2015-9-29, 05:51:59, and attribute value content that does not change is contentSize=1K.

It may be understood that results of the comparison for the attribute values that change that is performed by the resource server are the same, but methods for the comparison are different. In the first method, the attribute values of the attributes are directly compared, but in the second method, the update times of the attribute values in the resource are compared.

606. The resource server sends, to the registrar, attribute value content that changes.

Optionally, the attribute value content that changes may be added to the response.

If a sending time of a message generated by the resource server is "Tue, 29 Sep. 2015 06:01:59 GMT", and a response is generated based on attribute value content that changes (content=raining, cacheExpire=Tue, 29 Sep. 2015 07:00:00 GMT), the response is as follows:

```
HTTP/1.1 200 OK                          /indicating a successful response of 200 OK, complying
with the version HTTP/1.1.
  Content-Type: application/xml          /indicating that a content format of a message
body is XML.
  Date: Tue, 29 Sep 2015 06:01:59 GMT
  indicating that the message sending time is: Tuesday, September 29, 2015, 06:01:59
Greenwich Mean Time.
  <?xml version="1.0" encoding="UTF-8"?>
    <partialUpdate>                      /indicating a partial update.
    <contentInstance>                    /indicating that a resource part starts.
    <content>raining</content>           /indicating that an attribute value of content
is "raining".
    <cacheExpire> Tue, 29 Sep 2015 07:00:00 GMT </cacheExpire>
    /indicating that an attribute value of cacheExpire is Tuesday, September 29, 2015,
07:00:00.
    < lastModifiedTime >2015-9-29, 05:51:59   /indicating that the attribute value of
lastModifiedTime is "2015-9-29, 05:51:59".
    <contentInstance>                    /indicating that the resource part ends.
    </partialUpdate>                     /indicating that the partial update ends.
```

Optionally, the resource server may indicate, by using a different status code, for example, 3xy, that a partial attribute value in the resource changes.

It should be noted that when receiving the attribute value content that changes or the response, the registrar updates the corresponding attribute value based on the attribute value content that changes and stores the updated attribute value. For example, the foregoing response is used as an example for description. The registrar updates the attribute value of content of the locally stored resource in the response to "raining", updates the attribute value of "cacheExpire" to 'Tue, 29 Sep. 2015 07:00:00 GMT', and updates the attribute value of "lastModifiedTime" to "2015-9-29, 05:51:59".

607. The registrar receives the attribute value content that changes, and determines a valid resource.

Optionally, the registrar may receive the response, where the response includes the attribute value content that changes.

It may be understood that the registrar may receive an indication identifier (such as partialUpdate) of the response, or determine, by using a particular response status code (3xc partial update), that partial attribute value content in the resource changes.

In this case, the registrar determines that the valid resource is the received attribute value content that changes and attribute value content that does not change in the stored resource.

The registrar determines, based on the received attribute value content that changes, the attribute value content that does not change in the local storage. If it is determined, in the resource, that one part of the attribute value content changes, the other part of the attribute value content does not change.

Optionally, a valid attribute value content may be added to a new response. Specifically, the registrar modifies a message sending time to a current time, and adds the locally stored attribute value content (contentSize=1k) that does not change to the response, to generate the new response.

Optionally, the registrar receives the response. The registrar modifies the message sending time to the current time, updates the attribute value content that changes, and stores the updated attribute value content. For example, the registrar updates the attribute value of 'content' to 'raining', updates the attribute value of "cacheExpire" to "Tue, 29 Sep. 2015 07:00:00 GMT", and updates the attribute value of "lastModifiedTime" to "2015-9-29, 05:51:59". The registrar generates the new response based on the updated locally stored resource.

Optionally, the registrar updates the message sending time to the current time, updates the locally stored attribute value of content to "raining", updates the attribute value of "cacheExpire" to "Tue, 29 Sep. 2015 07:00:00 GMT", updates the attribute value of "lastModifiedTime" to "2015-9-29, 05:51:59", maintains the attribute value of "contentSize" unchanged, and generates the new response.

The generated new response is as follows:

```
HTTP/1.1 200 OK                          /indicating a successful response of 200 OK,
complying with the version HTTP/1.1.
  Content-Type: application/xml          /indicating that a content format of a
message body is XML.
  Date: Tue, 29 Sep 2015 06:01:59 GMT
  /indicating that the message sending time is: Tuesday, September 29, 2015, 06:01:59
Greenwich Mean Time.
```

```
<?xml version="1.0" encoding="UTF-8"?>
<contentInstance>                            /indicating that a resource part starts.
    <content Size>1k</contentSize>           /indicating that an attribute value of
contentSize is "1k".
    <content>raining</content>               /indicating that an attribute value of content
is "raining".
    <cacheExpire> Tue, 29 Sep 2015 07:00:00 GMT </cacheExpire>
    /indicating that an attribute value of cacheExpire is Tuesday, September 29, 2015,
07:00:00 GMT.
    < lastModifiedTime >2015-9-29, 05:51:59  /indicating that the attribute value of
lastModifiedTime is "2015-9-29, 05:51:59".
    <contentInstance>                        /indicating that the resource part ends.
```

608. The registrar sends the valid resource to the terminal.

The registrar may directly send the valid resource to the terminal.

Optionally, the valid resource is added to the response, and after modifying a message sending time, the registrar sends the response to the terminal.

It should be noted that:

(1). Step 603 to step 607 are a case in which the resource stored in the registrar has expired. Optionally, if the registrar determines, based on the cacheExpire attribute value, that the resource has not expired, the valid resource is the resource that is stored in the registrar and that is indicated by the URI.

(2). Step 605 to step 607 are a case in which the attribute value of lastModifiedTime received by the resource server is different from the attribute value of lastModifiedTime stored in the resource server. Optionally, if the attribute value of lastModifiedTime received by the resource server is the same as the attribute value of lastModifiedTime stored in the resource server, the resource server may generate identifier information. The identifier information indicates that the resource stored in the registrar does not change, that is, the attribute value content that changes is an empty set.

Optionally, the identifier information may be added to the response, the response indicates that the resource stored in the registrar does not change, and the response is as follows:

HTTP/1.1 304 Not Modified indicating that a returned 304 response indicates that the target attribute requested by using the fourth request does not change.

Date: Tue, 29 Sep. 2015 06:01:59 GMT indicating that the message sending time is: Tuesday, Sep. 29, 2015, 06:01:59 Greenwich Mean Time.

When the registrar receives the identifier information or the response sent by the resource server, the registrar determines that the valid resource is the resource stored in the registrar.

(3). In this embodiment, step 602 to step 607 are a case in which the registrar stores a response of the resource. If the registrar determines, based on the third request, that the registrar does not store the response of the resource, the registrar needs to forward the third request to the resource server, and obtains for the first time the resource from the resource server. The third request is shown in step 601.

If the resource server receives the third request, and the third request does not carry lastModifiedTime, it indicates that the resource is requested for the first time. The resource server determines, based on the URI of the resource, that the resource is requested, and the resource server generates a response.

For example, the response is as follows:

```
HTTP/1.1 200 OK     /200 OK indicates a successful response, complying with a
standard of the version HTTP/1.1.
    Content-Type: application/xml            /A content format of a message body is
XML.
    Date: Tue, 29 Sep 2015 05:51:59 GMT              /Message sending time.
    <?xml version="1.0" encoding="UTF-8"?>
        <contentInstance>                    /A resource part starts.
    <lastModifiedTime> Tue, 29 Sep 2015 04:51:59 GMT </lastModifiedTime>
    /An attribute value of lastModifiedTime of the resource is Tuesday, September 29,
2015, 04:51:59 Greenwich Mean Time.
        <contentSize>1k</contentSize>        /An attribute value of contentSize is "1k".
        <content>cloudy</content>            /An attribute value of content is "cloudy".
        <cacheExpire>Tue, 29 Sep 2015 06:00:00 GMT </cacheExpire>
    /An attribute value of cacheExpire of the resource is Tuesday, September 29, 2015,
06:00:00 Greenwich Mean Time.
    ...
        <contentInstance>                    /The resource part ends.
```

After receiving the response, the registrar may determine, based on cacheExpire, that storage needs to be supported. That is, when the resource includes the cacheExpire attribute value, the registrar stores the entire response.

It may be understood that the resource in step 502 in the embodiment corresponding to FIG. 5 and the resource in step 602 in the embodiment corresponding to FIG. 6 are each obtained after the registrar obtains and stores, after the terminal obtains for the first time the request from the registrar, the response from the resource server. The resource stored in the registrar is updated, so that data can be updated and stored regularly. Preferably, the data is synchronously updated and stored based on attribute value content that changes and that is subsequently returned by the resource server to the registrar.

In this embodiment, a storage mechanism is introduced to the registrar, and when the terminal requests the resource from the registrar, the registrar searches a storage by using the URI as the index. If determining that the resource is stored in the storage, the registrar determines, based on the cacheExpire attribute value, whether the resource has expired. If the resource has not expired, the registrar sends the stored resource to the terminal, without a need to obtain the resource from the resource server, thereby greatly reducing data transmission between the resource server and the registrar. Further, if the registrar determines that the resource has expired, the registrar sends the attribute value of lastModifiedTime of the resource to the resource server. The resource server compares the received attribute value of lastModifiedTime with a locally stored attribute value of lastModifiedTime, and if the two attribute values of lastModifiedTime are different, the resource server further performs comparison to determine an attribute value that is in a resource corresponding to the stored attribute value of lastModifiedTime and that changes relative to a resource corresponding to the received attribute value of lastModifiedTime, and sends, to the registrar, only the attribute value that changes, but does not send all attribute values in the resource to the registrar, thereby greatly reducing redundant information transmission between the registrar and the resource server, and saving a network resource.

A resource obtaining method is described in detail above. An embodiment of the present invention further provides a registrar. Referring to a schematic structural diagram of the registrar 700 shown in FIG. 7, the registrar includes a receiving module 701, a determining module 702, and a sending module 703.

The receiving module 701 is configured to receive a first request sent by a terminal for obtaining a target attribute included in a resource, where the first request carries a uniform resource identifier URI of the target attribute.

The determining module 702 is configured to determine, based on the URI received by the receiving module 701, that the registrar stores the resource to which the target attribute belongs, where the target attribute is partial content included in the resource.

The sending module 703 is configured to send, to the terminal, a valid target attribute indicated by the URI.

Further, the receiving module 701 is further configured to perform the steps such as step 502, step 507, step 602, and step 607 performed by the registrar in FIG. 5 and FIG. 6. The determining module 702 is further configured to perform step 503 and step 603 performed by the registrar in FIG. 5 and FIG. 6. The sending module is configured to perform step 504, step 508, step 604, and step 608 in FIG. 5 and FIG. 6. Details are not described in this embodiment of the present invention herein.

Figure 7:
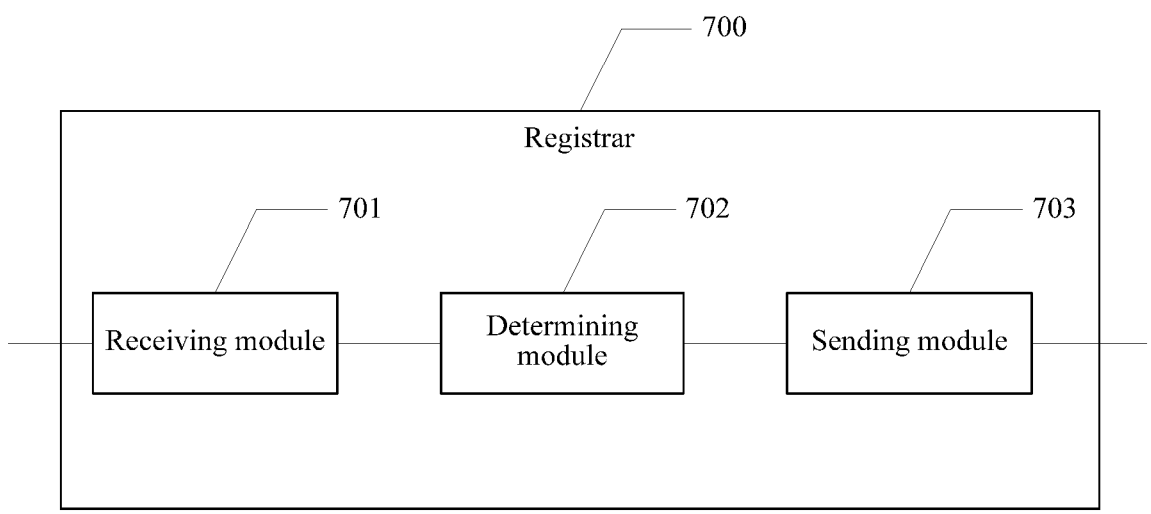
FIG. 7 is a schematic structural diagram of a registrar according to an embodiment of the present invention.

Further, the registrar in FIG. 7 is presented in a form of a functional module. The "module" herein may refer to an application-specific integrated circuit (application-specific integrated circuit, ASIC), a circuit, a processor and a memory executing one or more software or firmware programs, an integrated logic circuit, and/or another device that can provide the foregoing functions. In a simple embodiment, persons skilled in the art may figure out that the registrar in FIG. 7 may be in a form shown in FIG. 3. The modules may be implemented by using the processor, the transceiver, and the memory in FIG. 3.

Figure 8:
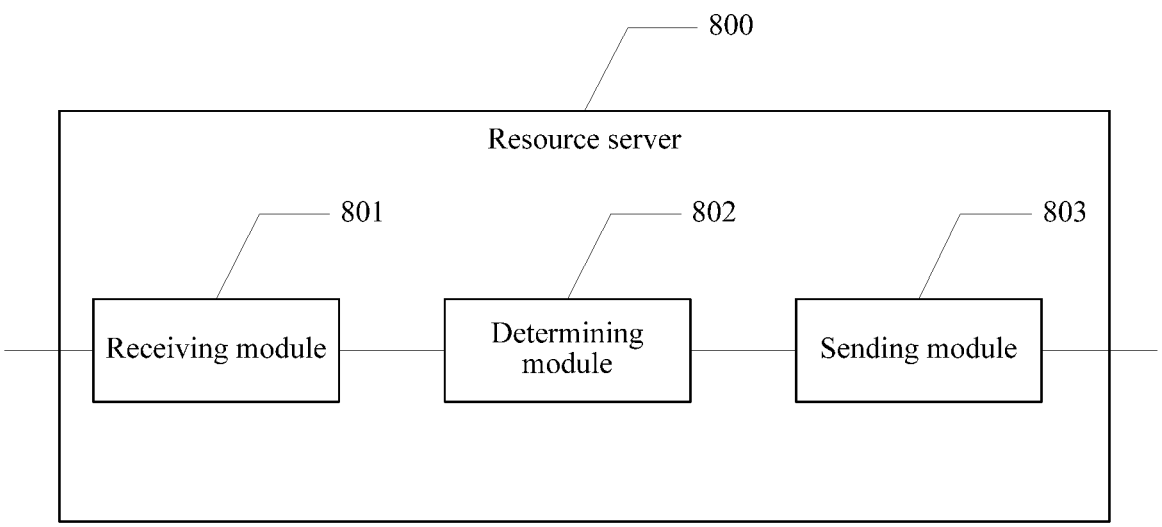
FIG. 8 is a schematic structural diagram of a resource server according to an embodiment of the present invention.

As shown in FIG. 8, an embodiment of the present invention further provides a schematic structural diagram of a resource server. The resource server is applied to an M2M system. The apparatus includes: a receiving module 801, a determining module 802, and a sending module 803.

The receiving module 801 is configured to receive a second request sent by the registrar for obtaining a target attribute included in a resource. The second request carries a uniform resource identifier URI of the target attribute and a last modified time attribute of the resource. The target attribute is partial content included in the resource.

The determining module 802 is configured to determine attribute value content that is in a target attribute stored in the resource server and that changes relative to a target attribute stored in the registrar, when a last modified time attribute value of the target attribute stored in the resource server is different from the received last modified time attribute value.

The sending module 803 is configured to send, to the registrar, the attribute value content that changes.

Further, the receiving module 801 is further configured to perform the step of "receiving the second request" in step 505 in FIG. 5 and the step of "receiving the fourth request" in step 605 in FIG. 6. The determining module 802 may further perform the step of "determining attribute value content that is in a target attribute stored in the resource server and that changes relative to a target attribute stored in the registrar, when a last modified time attribute value of the target attribute stored in the resource server is different from the received last modified time attribute value" in step 505 in FIG. 5, and the step of "determining attribute value content that is in a resource stored in the resource server and that changes relative to a resource stored in the registrar, when a stored last modified time attribute value of the resource is different from the received last modified time attribute value of the resource" in step 605 in FIG. 6. The sending module 803 may be further configured to perform step 506 and step 606 in FIG. 5 and FIG. 6. Details are not described herein again in this embodiment of the present invention.

Further, the apparatus in FIG. 8 is presented in a form of a functional module. The "module" herein may refer to an application-specific integrated circuit (application-specific integrated circuit, ASIC), a circuit, a processor and a memory executing one or more software or firmware programs, an integrated logic circuit, and/or another device that can provide the foregoing functions. In a simple embodiment, persons skilled in the art may figure out that the apparatus in FIG. 8 may be in a form shown in FIG. 3. The modules may be implemented by using the transceiver, the processor, and the memory in FIG. 3.

An embodiment of the present invention further provides a computer storage medium, configured to store a computer software instruction used by the registrar shown in FIG. 7 and the resource server shown in FIG. 8, including a program designed for executing the foregoing method embodiment. A resource may be obtained by executing the stored program.

Persons of ordinary skill in the art should understand that all or some of subject matters in this application may be implemented in software in combination with hardware and/or firmware. For example, the subject matters described in this specification may be implemented in software that is performed by one or more processors. In an example of an implementation, the subject matters described in this specification may be implemented by using a non-transitory computer readable medium that stores a computer executable instruction. When a computer processor executes the computer executable instruction, the instruction controls the computer to perform steps. An example of a computer readable medium applicable to implementation of the subject matters described in this specification includes the non-transitory computer readable medium, such as a magnetic disk storage device, a chip storage device, a programmable logical device, or an application-specific integrated circuit. In addition, the computer readable medium that implements the subject matters described in this specification may be located on a single device or computing platform, or may be distributed on a plurality of devices or computing platforms.

Finally, it should be noted that: the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

The invention claimed is:

1. A method of obtaining a resource, applied to a machine-to-machine (M2M) communications system, and comprising:
   receiving, by a registrar from a resource requester, a first request for obtaining a resource, wherein the first request carries a resource identifier of the resource;
   determining, by the registrar based on the resource identifier, that the registrar stores the resource;
   determining, by the registrar based on a valid period time attribute and a last modified time attribute of the resource, that the resource has expired, wherein the valid period time attribute indicates a validity period of the resource;
   sending, by the registrar to a resource server, a second request, wherein the second request carries a last modified time attribute value of the resource and the resource identifier;
   receiving, by the registrar, a response from the resource server;
   determining, by the registrar and based on a response status code in the response, that the response is a partial response;
   in response to determining that the response is a partial response, modifying, by the registrar, the response using a locally stored attribute value content; and
   sending, by the registrar to the resource requester, the modified response.

2. The method according to claim 1, wherein the resource identifier is a uniform resource identifier (URI) or a resource identifier defined in an M2M system.

3. The method according to claim 1, wherein the resource requester is registered with the registrar.

4. A registrar, applied to a machine-to-machine (M2M) system, and comprising:
   a memory; configured to store instructions;
   a transceiver; and
   a processor, coupled to the memory and the transceiver, to execute the instructions to cause the registrar to perform the following operations:
   receiving by the registrar from a resource requester a first request for obtaining a resource, wherein the first request carries a resource identifier of the resource;
   determining, based on the resource identifier, that the registrar stores the resource;
   determining, by the registrar based on a valid period time attribute and a last modified time attribute of the resource, that the resource has expired, wherein the valid period time attribute indicates a validity period of the resource;
   sending, by the registrar to a resource server, a second request, wherein the second request carries a last modified time attribute value of the resource and the resource identifier;
   receiving, by the registrar, a response from the resource server;
   determining, by the registrar and based on a response status code in the response, that the response is a partial response;
   in response to determining that the response is a partial response, modifying, by the registrar, the response using a locally stored attribute value content; and
   sending, to the resource requester, the modified response.

5. The registrar according to claim 4, wherein the resource identifier is a uniform resource identifier (URI) or a resource identifier defined in an M2M system.

6. The registrar according to claim 4, wherein the resource requester is registered with the registrar.

7. The method according to claim 1, wherein the resource requester comprises a terminal.

8. The registrar according to claim 4, wherein the resource requester comprises a terminal.

* * * * *